March 3, 1959  R. J. HOLTON  2,875,487
FASTENING DEVICE
Filed Oct. 8, 1956
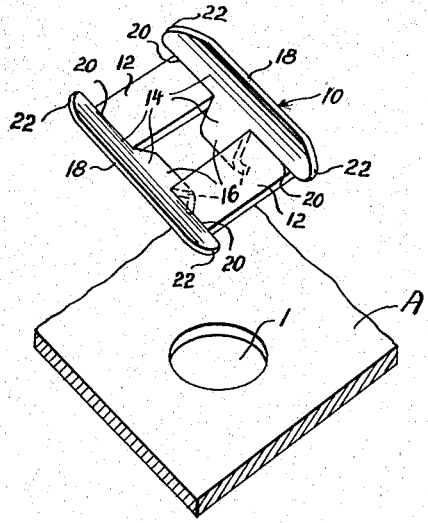
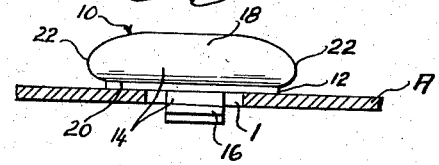
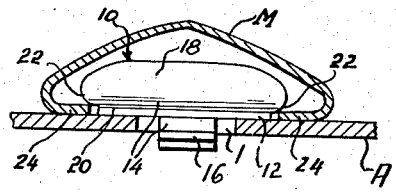
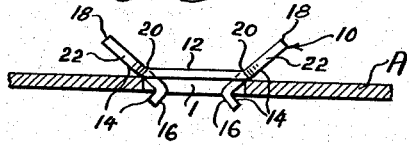
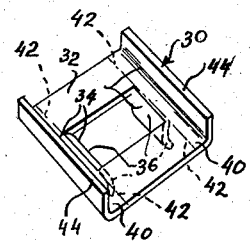
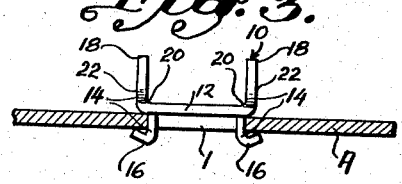
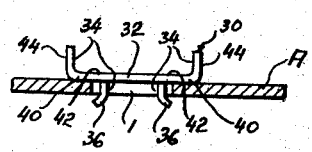
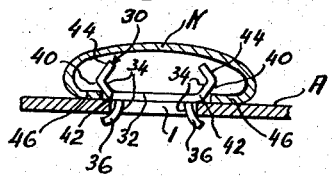
INVENTOR
ROBERT J. HOLTON
BY Bates, Teare & McBean
ATTORNEYS

United States Patent Office 2,875,487
Patented Mar. 3, 1959

2,875,487
FASTENING DEVICE

Robert J. Holton, Cleveland, Ohio, assignor to Tinnerman Products, Inc., Cleveland, Ohio, a corporation of Ohio Application October 8, 1956, Serial No. 614,567

5 Claims. (Cl. 24—73)

This invention relates to clips or fasteners for mounting moldings, trim strips and similar objects on a supporting part and deals, more particularly, with improvements in such clips or fasteners which are adapted to be positively secured in an opening in a supporting part by a simple assembling and fastening operation taking place entirely from the outer or accessible side of the supporting part.

The several forms of clips or fasteners in accordance with the invention are of the general character which comprise a sheet metal body defining a head or base carrying a pair of cooperating shank elements that are receivable in a work opening and secured in fastening position therein by an operation providing for expansion of said shank elements into locking relation with marginal portions of the work opening. This application is a continuation in part of prior copending application Serial Number 542,417 filed October 24, 1955.

A primary object of the invention is to provide several forms of clips or fasteners of this character in an improved, highly simplified construction comprising a relatively small, inexpensive piece of sheet metal providing the base or body of the clip or fastener and a pair of cooperating arms defining elements projecting from both the inner and outer surfaces of said base, with the outer elements serving the dual purpose of means for expanding the inner elements to anchored position in a work opening in a supporting part, and means for mounting a molding, trim strip or other object on said supporting part.

Another object of the invention to provide several forms of such clips or fasteners in an improved construction comprising a relatively small, inexpensive piece of sheet metal providing the base of the clip or fastener and a pair of cooperating shank elements projecting from the inner or undersurface thereof, with each shank element included in a movable arm having opposite free ends projecting from both the inner and outer surfaces of said base in an arrangement in which the inner free ends of said arms defined a pair of cooperating shank elements adapted to be expanded into secured position in a work opening in a supporting part responsive to movement of the outer free ends of said arms to a predetermined position in which said outer free ends of said arms serve as means for mounting a molding, trim strip or other object on the supporting part.

A further object of the invention is to provide several forms of such clips or fasteners in an improved construction comprising a sheet metal body defining a base and a pair of movable arms struck and formed from said sheet metal body with bendable connections to said base between opposite free ends of said arms projecting from both the inner and outer surfaces of said base, with the inner free ends of said arms defining cooperating shank elements adapted to be expanded to secured position in a work opening in a supporting part upon compression of the outer free ends of said arms toward each other to a predetermined position in which said outer free ends of said arms serve as means for mounting a molding, trim strip or other object on the supporting part.

A more specific object of the invention is to provide improved forms of clips or fasteners, as and for the purposes described, comprising a sheet metal body defining a base provided with a pair of cooperating shank elements stamped therefrom and projecting from the inner or undersurface of said base and joined to head elements formed from opposite ends or sides of said base and projecting from the outer surface of said base in a manner whereby said shank elements are adapted to be expanded into secured position in a work opening in a supporting part responsive to compression of said head elements to a predetermined position in which said head elements serve as means for mounting a molding, trim strip or other object on the supporting part.

Further objects and advantages, and other new and useful features in the construction, arrangement and general combination of elements and details of construction of the improved clips or fasteners of the invention, will be apparent as the following description proceeds with reference to the accompanying drawings, for purposes of illustration but not of limitation, in which like reference characters designate like parts throughout, and in which:

Fig. 1 is a perspective view of a clip or fastener in accordance with the invention as seen from the outer side thereof and shown in position to be applied to secured position in a work opening in a supporting part;

Fig. 2 is a sectional view showing the clip or fastener of Fig. 1 in end elevation as initially assembled in the work opening in the supporting part preparatory to securing the same in said work opening;

Fig. 3 is a view similar to Fig. 2 showing the clip or fastener as bent or applied to secure the same in the work opening;

Fig. 4 is a sectional view showing the clip or fastener in side elevation in secured position in the work opening; and, Fig. 5 is a view similar to Fig. 4 showing a molding mounted on the supporting part in connection with the clip or fastener secured to said supporting part;

Fig. 6 is a perspective view of another form of clip or fastener in accordance with the invention;

Fig. 7 is a sectional view showing the clip or fastener of Fig. 6 in end elevation as initially assembled in a work opening in a supporting part preparatory to securing the same in said work opening; and, Fig. 8 is a sectional view showing the clip or fastener of Fig. 7 in end elevation as bent to secure the same in the work opening and with a molding connected thereto in mounted position on the supporting part.

Referring now, more particularly, to the drawings, Figs. 1–5, inclusive, disclose a preferred form of clip or fastener 10 in accordance with the invention which is applied and secured in a work opening 1 in a supporting part such as a panel A, as illustrated in Figs. 2, 3 and 4, in position for mounting a molding M or similar object on the supporting part A, substantially as shown in Fig. 5.

The supporting part A is usually in the form of a plate or panel, or the like, and is provided with a series of spaced openings 1 for the required number of clips 10 to be secured thereto along the path which the molding M is to extend in mounted position. The panel A may be of any suitable metal, wood or fibre board material and the openings 1 therein may be round, rectangular or of any other suitable outline, but usually are provided in the manner of ordinary circular holes which involve the least cost inasmuch as only the simplest and cheapest punching or drilling tools are required.

The clip or fastener 10, Figs. 1–5, inclusive, is a simple inexpensive article of manufacture which is readily constructed from any suitable malleable sheet metal such as cold rolled steel or malleable spring metal. The clips may be formed from blanks of various outlines, of course, but from a quantity production standpoint, are most advantageously provided from a comparatively small, generally rectangular blank, such as indicated in Fig. 1, which is readily obtained from standard sheet metal strip stock with little loss or waste of material.

The sheet metal blank or body defines the base 12 of the clip or fastener 10 and is provided with a partially severed area preferably in the approximate center thereof, as best seen in Fig. 1, forming a pair of substantially T-shaped movable arms 14 each comprising a tongue 16 joined to an elongate tab or head element 18 having a bendable or hinged connection to said base 12 along the bend lines 20, Fig. 1. To this end, the stamping arrangement seen in Fig. 1 is particularly advantageous in that it is highly simplified and may be easily provided in a comparatively small area as is necessary for making the clips or fasteners in relatively small sizes. This simplified stamping arrangement requires merely a pair of spaced parallel slits and an intermediate transverse slit defining said tongues 16 having inner free ends and their opposite ends joined to adjacent side or end portions of the blank defining said head elements 18. The head elements 18 may be of any desired size, length or shape depending on the intended purpose or use of the clip and, if desired, may be provided as simple tabs only slightly wider than the width of the tongues 16.

In the present example, the opposite lateral extremities of said head elements or tabs 18 are formed in the shape of cam shoulders or similar retaining portions 22 adapted for snap fastening engagement with the inturned flanges 24 on the molding M, as shown in Fig. 5, or for similar attachment with the inner walls of a hollow or channel-shaped object such as a trim strip, or the like.

The arrangement, accordingly, is such that each of the substantially T-shaped movable arms 14 comprises an elongate head element or tab 18 having a free end and bendably connected to the fastener base 12 along the bend lines 20 and carrying a tongue 16 having a free end extending in the opposite direction from the free end of said head element or tab 18. When the arms 14 are bent about the bend lines 20 in the initial formation of the clip 10, as shown in Figs. 1 and 2, the free ends of said head elements 18 project outwardly from the outer or upper surface of the fastener base 12 while the free ends of the tongues 16 project downwardly from the inner or undersurface of said fastener base 12. The arms 14 thus are united to the fastener base 12 in bendable connections intermediate the lengths of said arms 14 and in a manner whereby the tongues or shank elements 16 projecting from the inner or undersurface of said base 12 are movable outwardly from each other responsive to inward movement of the head elements 18 projecting from the upper surface of said base where they are readily accessible for securing the clip or fastener in a work opening by an operation taking place entirely from the outer side of an assembly.

Preferably the head elements or tabs 18 are provided in an initial diverging relation substantially as shown in Figs. 1 and 2 with the tongues 16 carried thereby curved or directed inwardly and then outwardly to provide a pair of cooperating shank elements in the form of outwardly extending hooks, or the like, projecting from the undersurface of the fastener base 12 and adapted to be readily received in the work opening 1 in the panel A or other support in the initial step for securing the clip 10 in said work opening 1.

The completed clip or fastener 10 appears substantially as shown in Fig. 1, and in securing the same to the panel or other support A, the clip is initially applied as shown in Fig. 2 to seat the fastener base 12 on said panel A with the shank elements or hooks 16 easily and quickly received in the work opening 1 and having their free ends projecting beyond the underside of said panel A. The head elements or tabs 18 have the free ends thereof projecting from the outer side of the assembly and thus are readily accessible for quick and easy actuation by a suitable tool, such as a pair of pliers, to compress said head elements 18 inwardly toward each other from their initial diverging relation seen in Figs. 1 and 2 to substantially parallel relation as shown in Fig. 3. Such inward movement of the head elements 18 toward each other causes the arms 14, including the shank elements or hooks 16, to pivot about their bendable connections 20 to the base 12 in a manner whereby said hooks 16 are forced outwardly to overlap the adjacent edges of the work opening 1 with the free ends of said hooks 16 defining pronounced shoulders or abutments directed toward the underside of the panel A and positively engaging material portions of said panel A adjacent the work opening 1 to positively lock the clip or fastener 10 in secured position in said work opening 1.

In the procedure for mounting the molding M, Fig. 5, on the panel A, as many clips or fasteners 10 as are necessary are similarly secured in work openings 1 prepared in said panel A in aligned relation along the path in which the molding M extends in the completed assembly. The molding M is positioned over the clips 10 with the inturned flanges 24 thereof adjacent the cam shoulders 22 on the lateral extremities of the head elements 18 on the clips. When downward pressure is exerted on the top of the molding M, the edges of the inturned flanges 24 on said molding M are sprung into attached position on said cam shoulders 22 as shown in Fig. 5 to provide the completed mounting of said molding M on the panel or other supporting part A. This operation is in the nature of a snap fastening action which takes place as a result of the inherent resiliency of the inturned flanges 24 of the molding M in expanded gripping engagement with said cam shoulders 22 on the clips 10.

Figs. 6–8, inclusive, disclose another form of clip or fastener 30 in accordance with the invention which is generally similar in construction, application and use to that described with reference to Figs. 1–5, inclusive. The clip or fastener 30, likewise is provided from a generally rectangular sheet metal body defining a base 32 and arms 34 formed from opposite end or side portions of said base 32. The arms 34 include similar tongues 36 stamped in said base 32 and bent to provide outwardly directed hooks or shank elements projecting from the undersurface of said base 32.

The hooks of shank elements 36 have their inner ends connected to angularly shaped head elements each comprising an initially horizontal flange or web 40 extending in the plane of said base 32 from adjacent a bend line 42 and joined to an initially vertical flange or tab 44 projecting outwardly from the outer surface of said base 32. The head elements composed of said angularly disposed flanges 40, 44, may be of any desired size, length or shape depending on the intended purpose and use of the clip and, if desired, may be provided as simple tabs only slightly wider than the width of the tongues or hook elements 36.

The completed clip or fastener 30 appears substantially as shown in Fig. 6, and in securing the same to the panel or other support A, the clip is initially applied as shown in Fig. 7 to seat the fastener base 32 on said panel A with the shank elements or hooks 36 easily and quickly received in the work opening 1 and having their free ends projecting beyond the underside of said panel A. The initially vertical flanges or tabs 44 have the free ends thereof projecting from the outer side of the assembly and thus are readily accessible for quick and easy actuation by a suitable tool, such as a pair of pliers, to compress said vertical flanges 44 inwardly toward each other from their initial vertical relation, Figs. 6 and 7, to inwardly inclined converging relation substantially as shown in Fig. 8. Such inward movement of the vertical flanges 44 toward each other causes the arms 34, including the initially horizontal flanges 40 and shank elements or hooks 36, to pivot about the bend lines 42 in a manner whereby said hooks 36 are forced outwardly to overlap the adjacent edges of the work opening 1 at the underside of said panel A with the free ends of said hooks 36 defining pronounced shoulders or abutments engaging material portions of said panel A adjacent the work opening 1 to positively lock the clip or fastener 30 in secured position in said work opening 1.

The initially horizontal flanges or webs 40 are simultaneously bent outwardly along the bend lines 42 from their normal position in the plane of the base, Figs. 6 and 7, to the outwardly diverging relation thereof shown in Fig. 8. In this position, said flanges 40, in diverging relation, define resilient cam surfaces or simliar retaining means adapted for snap fastening engagement with the inturned flanges 46 on the molding N, Fig. 8, or for similar attachment with the inner walls of a hollow or channel-shaped object such as a trim trip, or the like.

In mounting the molding N, Fig. 8, on the panel A, as many clips or fasteners 30 as are necessary are similarly secured in work openings 1 prepared in said panel A in aligned relation along the path in which the molding N extends in the completed assembly. The molding N is positioned over the clips 30 with the inturned flanges 46 thereof in engagement with the upper surfaces of the inwardly inclined flanges 44 on the clips. When downward pressure is exerted on the top of the molding N, the edges of the inturned flanges 46 on said molding N are sprung into engagement with the diverging flanges 40 on the clips as shown in Fig. 8 to provide the completed mounting of said molding N on the panel or other supporting part A. This operation is in the nature of a snap fastening action which takes place by reason of the inherent resiliency of the inturned flanges 46 of the molding N and the inherent resiliency of said diverging flanges 40 on the clips 30, Fig. 8.

While the invention has been described in detail with specific examples, such examples are intended as illustrations only inasmuch as the invention fully contemplates various modifications which may be provided without departing from the spirit and scope of the invention.

I claim:

1. A malleable one piece clip comprising a sheet metal body having a generally planular base and a pair of spaced movable arms, said arms being integrally connected to said base intermediate the ends of said arms and substantially in the plane of said base, said arms defining a pair of head elements projecting from one surface of said base and a pair of shank elements projecting from the opposite surface of said base, each of said shank elements being movable in a predetermined direction to a permanently deformed position responsive to movement of its associated head element in the opposite direction for securing said shank elements to a supporting part, and means on said head elements for mounting an object in secured relation on said supporting part.

2. A malleable one piece clip comprising a sheet metal body having a generally planular base and a pair of spaced movable arms integrally connected to said base intermediate the ends of said arms, said arms defining a pair of head elements facing each other and projecting from one surface of said base and a pair of outwardly directed hooks projecting from the opposite surface of said base, said head elements being hinged to said base along bend lines disposed generally in the plane of said base and carrying said hooks, said hooks being movable outwardly from each other to permanently deformed positions to secure the hooks to a supporting part responsive to movement of said head elements inwardly toward each other and about their hinged connections to said base, and means on said head elements for mounting and retaining an object on said supporting part.

3. A malleable one piece clip adapted for insertion into an opening in a supporting panel, said clip comprising a sheet metal body providing a generally planular base and a pair of spaced permanently deformable arms, said arms being integrally connected to said base intermediate the ends of said arms and substantially in the plane of said base, said arms defining a pair of tabs projecting from one surface of said base and a pair of hook portions projecting from the opposite surface of said base, each of said hook portions being movable in a predetermined direction to a secured and permanently deformed position in the work opening responsive to movement in the opposite direction of the associated of said tabs, said tabs including cam shoulders for gripping and retaining in snap-fastening relation an object in mounted position on the supporting part.

4. A malleable one piece clip adapted for insertion into a blind opening in a supporting part, said clip comprising a sheet metal body providing a generally planular base having partially severed portions within the periphery thereof, each of said severed portions including a movable arm integrally connected to said base intermediate the ends of said arm, each movable arm comprising a tab projecting from one surface of said base and hinged thereto substantially in the plane of said base and a shank element projecting from the opposite surface of said base and carried by the associated tab, said shank element being pivotable outwardly responsive to inward pivotal movement of its associated tab about its hinged connection to said base for permanently deforming and thus securing said shank element to the supporting part, said tabs projecting laterally of the perimeter of said base and including cam shoulders on such laterally projecting portions for gripping in snap-fastening relation an object for retaining the latter in mounted position on said supporting part.

5. A malleable one piece clip comprising a sheet metal body having a base and a pair of spaced permanently deformable arms integrally connected to said base intermediate the ends of said arms, said arms including a pair of head elements projecting generally from one surface of said base and a pair of shank elements projecting from the opposite surface of said base, said head elements each comprising a web bendably connected to said base and initially disposed substantially in the plane of said base and an upwardly projecting tab relatively rigidly joined to the outer edge of said web, said shank elements being movable outwardly with respect to one another to secured relation with the supporting part responsive to inward movement of said head elements toward one another and about their bendable connections to said base, said webs being disposed generally obliquely with respect to said base when said shank elements are in said secured relation with the supporting part, said webs and said tabs defining retaining means for gripping in snap-fastening relation an associated object such as a molding strip, and retaining the latter in mounted position on said supporting part.

References Cited in the file of this patent

UNITED STATES PATENTS

| | | |
|---|---|---|
| 2,166,916 | Lombard | July 18, 1939 |
| 2,460,722 | Waara | Feb. 1, 1949 |
| 2,618,193 | Peckham | Nov. 18, 1952 |
| 2,748,645 | Peckham et al. | June 5, 1956 |